United States Patent [19]
Melnikov et al.

[11] Patent Number: 5,646,505
[45] Date of Patent: Jul. 8, 1997

[54] METHOD OF CHARGING A BATTERY USING ASYMMETRICAL CURRENT

[75] Inventors: Izot F. Melnikov; Anatoliy G. Nikolayev, both of St. Petersburg, Russian Federation

[73] Assignee: Vista International, Inc., Alpharetta, Ga.

[21] Appl. No.: 526,057

[22] Filed: Sep. 8, 1995

Related U.S. Application Data

[63] Continuation-in-part of Ser. No. 169,978, Dec. 17, 1993, Pat. No. 5,449,998, which is a continuation-in-part of Ser. No. 16,833, Feb. 12, 1993, abandoned.

[51] Int. Cl.$^6$ .................................................. H01M 10/44
[52] U.S. Cl. .................................................. 320/21; 320/14
[58] Field of Search .............................. 320/3, 4, 14, 21, 320/22; 363/42, 43

[56] References Cited

U.S. PATENT DOCUMENTS

| | | | |
|---|---|---|---|
| 3,021,468 | 2/1962 | Reich | 320/2 |
| 3,746,961 | 7/1973 | Dobie | 320/48 |
| 4,668,901 | 5/1987 | Furukawa | 320/31 |
| 4,728,877 | 3/1988 | Adamson | 320/21 |
| 4,774,449 | 9/1988 | Elkins | 320/21 |
| 4,829,225 | 5/1989 | Podrazhansky et al. | 320/14 |
| 5,206,578 | 4/1993 | Nor | 320/14 |
| 5,291,117 | 3/1994 | Rydborn | 320/21 |
| 5,307,000 | 4/1994 | Podrazhansky et al. | 320/14 |
| 5,449,998 | 9/1995 | Melnikov | 320/48 |

FOREIGN PATENT DOCUMENTS

| | | | |
|---|---|---|---|
| 775817 | 10/1980 | U.S.S.R. | H02J 7/02 |
| 813588 | 3/1981 | U.S.S.R. | H02J 7/00 |
| WO94/29940 | 12/1994 | United Kingdom | H02J 7/02 |

OTHER PUBLICATIONS

Hallows, Raplh W., Dry Cells can be Reactivated, Radio Electronics, p. 49 Dec. 1956.

*Primary Examiner*—Peter S. Wong
*Assistant Examiner*—Patrick B. Law
*Attorney, Agent, or Firm*—Dougherty & Associates

[57] ABSTRACT

A method of charging a discharged battery by creating a level direct current carrier and a riding alternating current charging vector which rides on the level direct current, the alternating current having a repeating waveform comprising two phase displacements per wavelength. The phase displacements comprise a first amplitudinal increase and a second amplitudinal increase, a first amplitudinal decrease and a second amplitudinal decrease, the second amplitudinal increase beginning substantially at the same time that the phase angle of the alternating current charging vector returns to a zero angle, the second amplitudinal decrease ending substantially at the same time that the phase angle of the alternating current charging vector returns to a forty five degree angle; cyclically repeating the waveform at a constant angular frequency, phase period and amplitude; and applying such alternating current through battery terminals for a sufficient period of time for the level direct current carrier to rise substantially to the original direct current voltage of the battery in accordance with the affectivity of the alternating current charging vector and to charge the battery.

4 Claims, 3 Drawing Sheets

METHOD OF CHARGING A BATTERY USING ASYMMETRICAL CURRENT

CROSS REFERENCE TO RELATED APPLICATION

This application is a continuation-in-part of our U.S. patent application Ser. No. 08/169,978 filed Dec. 17, 1993 U.S. Pat. No. 5,449,998, which is a continuation-in-part of our application Ser. No. 08/016,833 filed Feb. 12, 1993, now abandoned.

FIELD OF THE INVENTION

The present invention relates to an apparatus for the desulphation, charging, and the prevention of sulphation of batteries, and more particularly to a battery charger apparatus capable of repeatedly charging dry cells, including galvanic, alkaline, lithium, mercury oxide, silver oxide, zinc-carbon, zinc chloride, and nickel-cadmium batteries, both rechargeable and non-rechargeable, as well as wet cells, including lead-acid batteries, by asymmetrical current from an alternating current source.

BACKGROUND OF THE INVENTION

A battery charger normally employs a large, expensive, and heavy transformer for stepping down the AC line voltage to a value compatible with the battery voltage. This known charger can only recharge so called "rechargeable batteries, such as lead-acid batteries. So called transformer-less battery chargers are also well known in the art. These generally use a diode bridge circuit requiring at least four diodes and are also limited to charging (or recharging) of rechargeable batteries.

Throughout this specification, the term "desulphation" means the cleaning of the battery terminals.

The present invention includes a circuit capable of charging both rechargeable and non-rechargeable dry galvanic cells using a transformer-less circuit having a minimum number of components, thereby minimizing the cost and size of the apparatus. Further, the charging current is not influenced by the number of batteries being charged, but rather is determined by the accumulating capacity of the circuit.

DESCRIPTION OF RELATED ART

Applicants are aware of the following U.S. Patents concerning transformer-less battery chargers.

| U.S. Pat. No. | Issue Date | Inventor | Title |
| --- | --- | --- | --- |
| 3,013,198 | 12-12-1961 | Witte | CELL UNIT FOR INSERTION INTO A FLASHLIGHT |
| 3,176,212 | 03-30-1965 | De Puy | DIRECT CURRENT POSER SUPPLIES |
| 3,382,425 | 05-07-1968 | Legatti | BATTERY CHARGER |
| 3,708,738 | 01-02-1973 | Crawford | BATTERY CHARGING AND DISCHARGE APPARATUS |
| 3,867,682 | 02-18-1975 | Yamauchi | BATTERY CHARGER WITH MEANS FOR PREVENTING OVERCHARGING OF THE BATTERY |
| 3,876,921 | 04-08-1975 | Bigbee | INTEGRATED REJUVENABLE ENERGY SYSTEM AND METHOD |
| 3,970,912 | 07-20-1976 | Hoffman | BATTERY CHARGING CIRCUIT |
| 3,987,354 | 10-19-1976 | Mason | REGULATING CIRCUIT |
| 4,146,825 | 03-27-1979 | Harhay | ELECTRIC BATTERY POWERED VEHICLE |
| 4,321,523 | 02-23-1982 | Hammel | BATTERY CHARGER AND POWER SUPPLY CIRCUITRY |
| 4,389,608 | 06-21-1983 | Dahl | TRANSFORMERLESS BATTERY CONTROLLED BATTERY CHARGER |
| 4,472,672 | 09-18-1984 | Pacholok | HIGH POWER FACTOR SWITCHING-TYPE BATTERY CHARGER |
| 4,621,225 | 11-04-1986 | Birk | PASSIVE TRANSFORMERLESS BATTERY CHARGING UNIT |

While some of the above mentioned patents have features of the present invention, all are lacking in some respect. Most of the above patents require extensive circuitry and have operational limitations, and none are designed to operate on non-rechargeable batteries. Of those listed above, Witte, Birk and Mason are the most relevant.

Witte shows a rechargeable cell unit wherein the line voltage is applied to a voltage divider across a discharge resistor. By using the dry rectifier to provide resistance, the charging rectifier is protected against high voltage peaks occurring in the changing voltage.

Birk also shows a flashlight battery charging circuit. However in Birk, the line voltage is supplied through a coupling capacitor and then is full-wave rectified. The storage capacitor is charged during alternate half cycles of the AC supply voltage to a relatively high voltage. On the remaining half cycle the storage capacitor discharges through an LED and a resistor to supply the battery a limited current at a relatively high voltage.

Mason shows a regulating circuit that can be used for charging where the current is regulated to be independent of the load.

SUMMARY OF THE INVENTION

The present invention relates to an improved battery charging circuit which avoids the disadvantages of prior charging circuits while affording additional structural and operating advantages.

A charging circuit for charging both rechargeable and non-rechargeable batteries from an AC power source utilizes capacitors and two diodes. The anode of the first diode is connected to a first output terminal and a first input terminal; the first diode's cathode is connected to the anode of the second diode whose cathode is connected to a second output terminal. The capacitors are connected to the second input terminal. One capacitor is further connected to the cathode of the first diode and therefore anode of the second. A second capacitor is further connected to the second output terminal.

The charging circuit is made up of a division network capable of delivering a unique asymmetrical waveform suitable for transferring negative ions to a discharged alkaline-type battery, thereby restoring the battery to its designated voltage and charge capacity level without heat degradation. The alternating current having a repeating waveform which rises from an initial level to a first peak, drops a short distance, rises to a second peak lesser than the first peak, then drops back to its initial level which it maintains for an interval, then rises to the same level as the first peak and repeats, and applying such alternating current through the battery terminals for a sufficient period of time to charge the battery.

OBJECTS OF THE INVENTION

The principal object of the invention is to provide an improved apparatus for desulphation, charging and preventing the sulphation of batteries.

Another object of this invention is to provide apparatus for charging dry galvanic cells by asymmetrical current from alternating current.

Another object of the invention is to provide apparatus for charging a number of cells wherein the accumulating capacity of the device and not the charge time influences the value of charging current.

Another object of the invention is to provide apparatus for controlling the current to the cells to be charged when cells are sufficiently recharged so as to prevent overcharging.

BRIEF DESCRIPTION OF THE DRAWINGS

The foregoing and other objects will become more readily apparent by referring to the following detailed description and the appended drawings in which.

DETAILED DESCRIPTION

Figure 1:
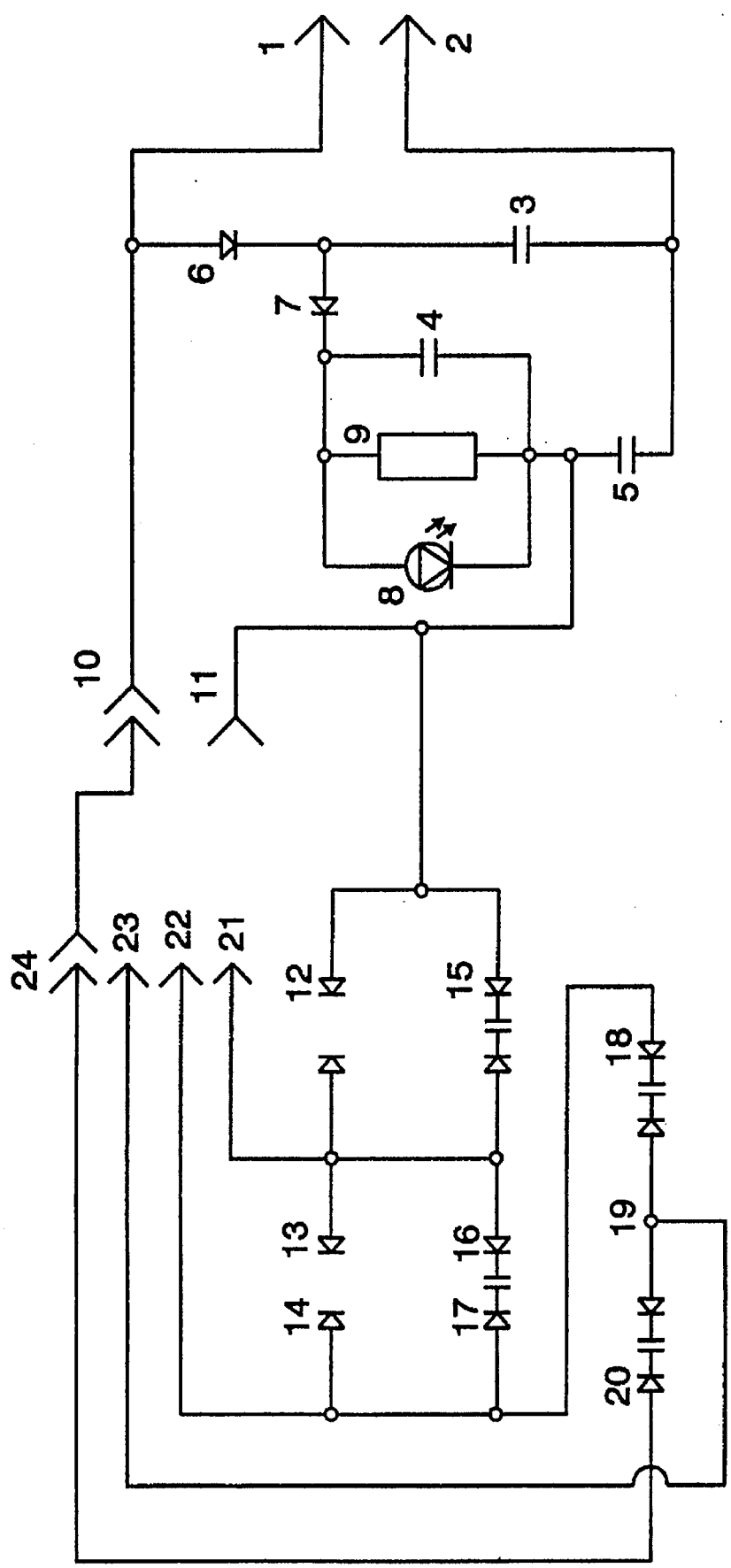
FIG. 1 is a schematic circuit diagram of a battery charging circuit constructed in accordance with and embodying the features of the present invention.

Referring now to FIG. 1, the invented circuit includes input terminals 1 and 2, adapted to be connected to a source of alternating current (120 v, 60 Hz, or 220 v, 50 Hz) and output terminals 10 and 11 being adapted for connection with terminals 12 through 24 which are adapted to be connected to the cells to be recharged. Input terminal 1 is connected respectively to the anode of diode 6 and to negative output terminal 10. The cathode of diode 6 is connected respectively to the anode of diode 7 and capacitor 3 whose other terminal is connected to input terminal 2. Input terminal 2 is also connected to capacitors 5. The other terminal of capacitor 5 in turn being connected to output terminal 11 and to the cathode of light emitting diode 8. The anode of light emitting diode 8 is connected to the cathode of diode 7. Light emitting diode 8 is connected in parallel to resistor 9 and capacitor 4. It is to be understood that the purpose of capacitor 4 and resistor 9 is to limit the current through light emitting diode 8 and, if an incandescent bulb is used as an indicator, they are not installed.

In operation, alternating line voltage is brought up to terminals 1 and 2. In the phase when "plus" is applied to the anode of diode 6 and "minus" to capacitor 3, capacitor 3 commences charging. This continues until capacitor 3 reaches the amplitudinal value of the source line voltage after which diode 6 is blocked. The voltage of one side of capacitor 3 is positive when compared to the other side and "zero" when compared to the circuit of line source and capacitor 3. During this semi-period, the line current is flowing in the circuit comprised of input terminal 1, output terminal 10, terminal 12 through 24, batteries, output terminal 11, capacitor 5, and finally input terminal 2.

From the start of the second half of this semi-period the voltage in the circuit of line source and capacitor 3 is gradually increasing to the batteries voltage. When the voltage of this circuit equals that of the battery, diode 7 opens and capacitor 3 starts to discharge to the battery via the circuit diode 7, resistor 9, battery, and line source.

When the polarity of the line voltage changes, the charging current continues to run until the voltage of the line source and capacitor 3 is equal to that of the batteries, whereupon capacitor 3 is charged with opposite polarity. When diode 7 is open the potentials of capacitors 3 and 5 are equalized by current running in the circuit capacitor 3, diode 7, resistor 9, and capacitor 5. Once the charging current is completed the device structure changes again. Capacitor 3 is again charged to the amplitudinal value of the line voltage, whereupon the described process repeats cyclically with the line voltage frequency.

If the voltage of the battery is higher than the amplitudinal value of the source voltage the process repeats but without capacitor 3 recharging. Instead, capacitor 3 is extra charged by the source and discharged to the battery. The capacitive resistance of capacitor 3 thus limits the battery charging current. During charging, capacitor 3 is connected with the line source consecutively-correspondingly, and, therefore is an extra voltage source. The battery is charged up to double the value of the amplitude of the line source voltage.

The actual amount the batteries will be charged is dependant on the quality of the battery, and more specifically the hermetic seal of the cell. In general, dry galvanic cells can be restored to greater than 80% of their electrical capacity through the use of the disclosed circuit.

Figure 2:
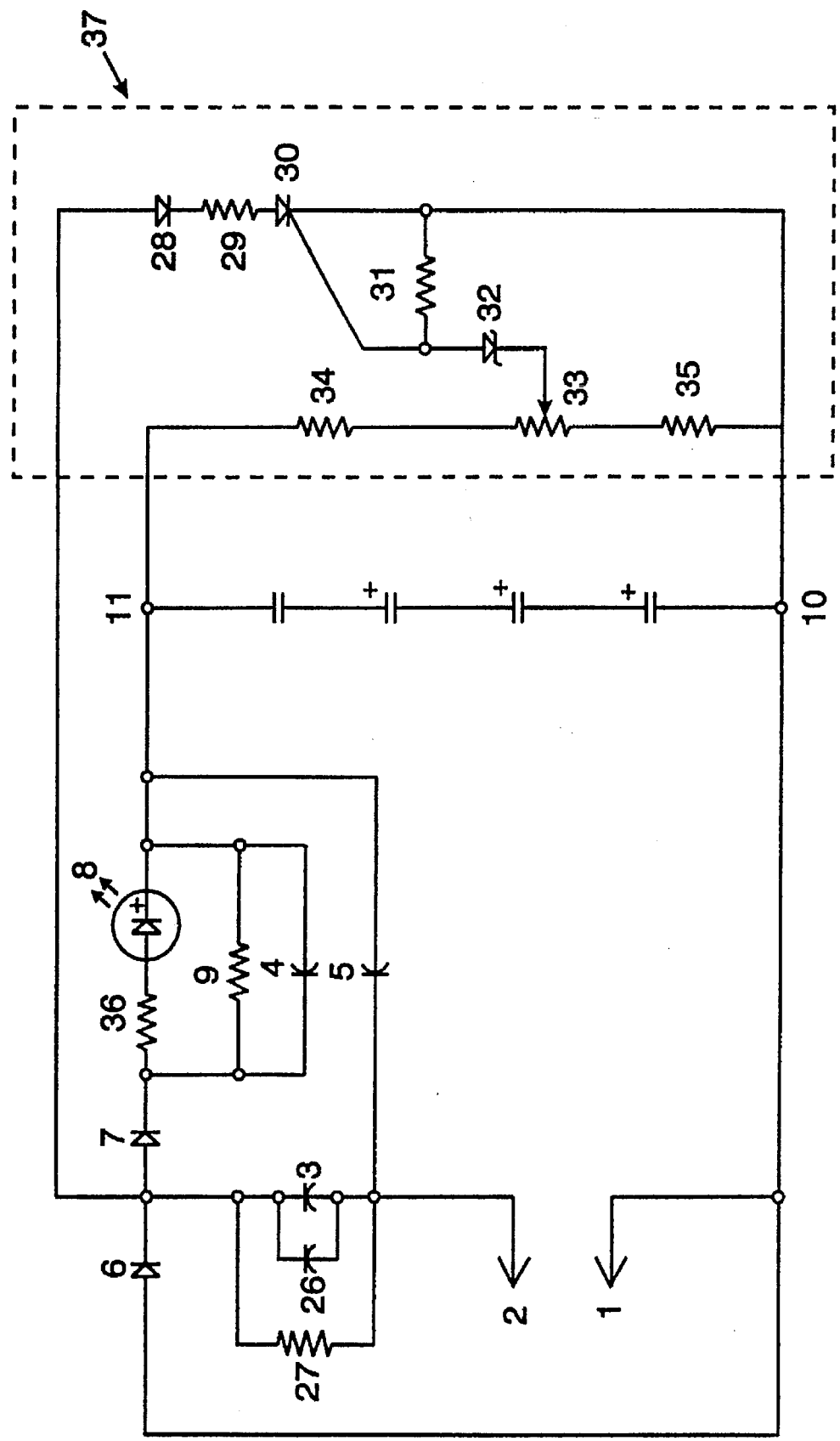
FIG. 2 is a schematic circuit diagram of the battery charging circuit with additional circuitry provided to prevent overcharging of the batteries.

The preferred embodiment of the inventive charger is shown in FIG. 2. The circuit shown is identical to that shown in FIG. 1 with several additions. The identical identification numbers used in both figures signify identical parts. Capacitor 26 and resistor 27 are connected in parallel to capacitor 3. Resistor 36 is connected in series with the LED 8 to limit the current through the LED 8. A control circuit 37 is connected to the charging circuit to prevent overcharging of the cells that are connected between output terminals 10 and 11.

The control circuit 37 comprises a diode 28 the anode of which is connected to the cathode of diode 6 and the anode of diode 7. The cathode of diode 28 is connected in series to resistor 29 which is connected to the anode of silicon controlled rectifier 30. The gate of SCR 30 is connected to the anode of zener diode 32 and to one terminal of resistor 31. The other terminal of resistor 31 is connected to the cathode of SCR 30. The cathode of SCR 30 is connected to output terminal 10. The cathode of zener diode 32 is connected to the wiper of potentiometer 33. One terminal of potentiometer 33 is connected in series to resistor 35 and the other terminal is connected to resistor 34. The other terminal of resistor 34 is connected to output terminal 11, while the second terminal of resistor 35 is connected to output terminal 10.

In operation, the potentiometer is adjusted by the user of the charger and is set to a level corresponding to the number and type of battery cell that is to be placed in the charger between output terminals 10 and 11. When the cells are sufficiently recharged by the operation of the circuit as described above and when terminal 2 is positive with respect to terminal 1, diode 7 and diode 28 are on and diode 6 is off. The increased voltage between terminals 10 and 11 due to sufficient recharging of the batteries creates a breakdown voltage in the zener diode 32. Due to the high resistance of the recharged cells between terminals 10 and 11, current is diverted from the cells and flows through resistor 34. Reverse current then flows through the zener diode 32 and into the gate of SCR 30. SCR 30 is thus activated so that current flows from the anode to the cathode of the SCR. This draws current from the charging circuit, thus bypassing the recharged cells and avoiding overcharging.

When terminal 1 is positive with respect to terminal 2, diode 28 and diode 7 are both off and diode 6 is on. Current flows through the circuit of diode 6, capacitor 5, and series resistors 34, 33, and 35.

Figure 3:
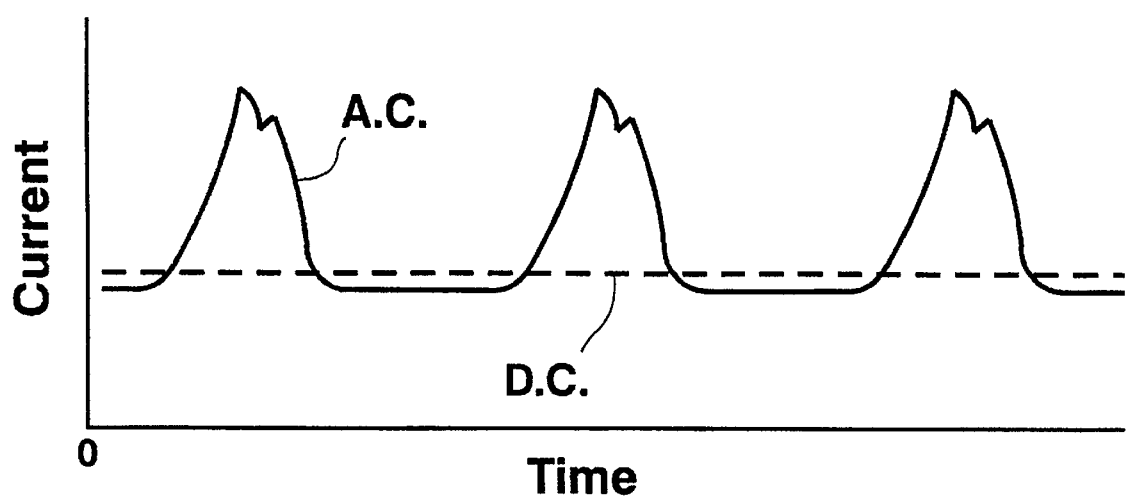
FIG. 3 is a schematic waveform diagram in accordance with the invention, showing the effect of the charging circuit on the battery being charged.

As shown in FIG. 3, the charging circuit delivers an unique asymmetrical waveform which can transfer negative ions to a discharged alkaline-type battery, thereby restoring the battery to its designated voltage and charge capacity level without heat degradation. Furthermore, a voltage feedback network across the charging alkaline battery is active and maintains a constant charging current followed by a downward avalanche current reduction when the batteries reach full charge. This safety factor eliminates battery destruction due to overcharge.

When polarization occurs, that is, the positive terminal AO of an alkaline battery is surrounded with a barrier of hydrogen oxide from its potassium oxide (KOH) electrolyte, the passage of free electrons to an external electrical circuit is impeded. Upon polarization, the internal resistance of the alkaline battery has increased and its electromotive force (emf) is reduced. At maximum internal resistance, the battery is said to be discharged and considered useless.

The battery charger's unique asymmetrical waveform disrupts the polarization of the anode whereby the displaced OH(−1) ions are chemically reunited with potassium to reform the original electrolyte, thereby reducing the battery's internal resistance and restoring the battery to a fully recharged condition. The charger produces two components: a level direct current carrier, and a riding alternating current vector, which rides on the level direct current. The alternating current vector is a charging vector, never changing in magnitude or direction; however, the level direct current carrier rises to alkaline battery's original direct current voltage in accordance with the affectivity of the AC charging vector.

In essence, the charger converts the alternating current into a pulsating direct current (alternating component) superimposed and riding on the rising direct current. This combination is capable of charging and recharging Alkaline batteries (as well as other battery types). The charger creates, as a direct result of the alternating and direct current superimposition, a unique waveform that is charger dependent and rises from an initial level to a first peak, drops a short way, rises to a second peak lesser than the first peak, then drops back to its initial level which it maintains for an interval then rises to the same level as the first peak and repeats, as shown in FIG. 3, until the battery is charged. Since it might be possible to obtain the same waveform from other charging components, this invention encompasses any components that will achieve this waveform.

The improved charging circuit charges both "rechargeable" and "non-rechargeable" batteries from an AC power source utilizing capacitors and two diodes. The circuit charges a cell with a level direct current carrier and a riding alternating current charging vector which rides on the level direct current. The circuit produces an alternating current with a repeating waveform that has two phase displacements per wavelength, an rms (root mean square) current, $I_{rms}$, relating to a peak value of the alternating current, $I_m$ as substantially equal to $0.707I_m$, a first amplitudinal increase and a second amplitudinal increase, each amplitudinal increase followed by an amplitudinal decrease whereby the second amplitudinal increase begins substantially at the same time that the phase angle of the alternating current charging vector returns to a zero angle. The second amplitudinal decrease ends substantially at the same time that the phase angle of the alternating current charging vector returns to a forty five degree angle, after which the waveform is cyclically repeated at a constant angular frequency, phase period and amplitude.

ALTERNATIVE EMBODIMENTS

The circuit described above can be modified to handle a variety of batteries of varying capacity, including galvanic, alkaline, lithium, mercury oxide, silver oxide, zinc-carbon, zinc chloride, and nickel-cadmium batteries, both rechargeable and non-rechargeable, as well as wet cells, including lead-acid batteries. Since the charging current does not depend on the load value, i.e., on the number and types of simultaneous charged cells, but depends on the accumulating capacity of capacitor 3, a simple light indicator could replace the light diode. Further enhancements can be made to the circuit to increase the functionality or safety of the device. For example, a switch can be added that disconnects the line voltage when the user is loading the device with batteries. The unit can be constructed in the same case as the battery, thereby eliminating the charging stand. Further, due to the limited circuitry involved, the charging device and the battery can be constructed directly into the appliance in which it is being used.

SUMMARY OF THE ACHIEVEMENT OF THE OBJECTS OF THE INVENTION

From the foregoing, it is readily apparent that we have invented an improved method and apparatus for the desulphation and charging of dry cell and wet cell batteries, both of the rechargeable and non-rechargeable type, more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method of charging a discharged battery comprising creating a level direct current carrier and a riding alternating current charging vector which rides on the level direct current, the alternating current having a repeating waveform comprising:

two phase displacements per wavelength, comprising;
   a first amplitudinal increase and a second amplitudinal increase, a first amplitudinal decrease and a second amplitudinal decrease, the second amplitudinal increase beginning substantially at the same time that the phase angle of the alternating current charging vector returns to a zero angle, the second amplitudinal decrease ending substantially at the same time that the phase angle of the alternating current charging vector returns to a forty five degree angle;

cyclically repeating said waveform is at a constant angular frequency, phase period and amplitude;

applying such alternating current through battery terminals for a sufficient period of time for the level direct current carrier to rise substantially to the original direct current voltage of the battery in accordance with the affectivity of the alternating current charging vector and to charge the battery.

2. A method according to claim 1 wherein the battery is a dry cell battery.

3. A method according to claim 1 wherein the battery is selected from the group consisting of galvanic, alkaline, lithium, mercury oxide, silver oxide, zinc-carbon, zinc chloride, and nickel-cadmium batteries, both rechargeable and non-rechargeable.

4. A method according to claim 1 wherein the battery is a wet cell battery.

* * * * *